US009544841B2

(12) United States Patent
Cui et al.

(10) Patent No.: US 9,544,841 B2
(45) Date of Patent: Jan. 10, 2017

(54) HYBRID NETWORK-BASED AND DEVICE-BASED INTELLIGENT RADIO ACCESS CONTROL

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Alan Blackburn, Woodstock, GA (US); William G. Mansfield, Sugar Hill, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 329 days.

(21) Appl. No.: 13/707,534

(22) Filed: Dec. 6, 2012

(65) Prior Publication Data

US 2014/0162648 A1 Jun. 12, 2014

(51) Int. Cl.
*H04W 48/18* (2009.01)

(52) U.S. Cl.
CPC .................................. *H04W 48/18* (2013.01)

(58) Field of Classification Search
CPC ................................................... H04W 48/18
See application file for complete search history.

(56) References Cited

U.S. PATENT DOCUMENTS

| 5,953,677 | A | 9/1999 | Sato |
| 6,314,308 | B1 | 11/2001 | Sheynblat et al. |
| 6,430,168 | B1 | 8/2002 | Djurkovic et al. |
| 6,628,946 | B1 | 9/2003 | Wiberg et al. |
| 7,082,305 | B2 | 7/2006 | Willars et al. |
| 7,116,970 | B2 | 10/2006 | Brusilovsky et al. |

(Continued)

FOREIGN PATENT DOCUMENTS

| AU | 2005320356 | 12/2005 |
| EP | 2244503 | 10/2010 |

(Continued)

OTHER PUBLICATIONS

U.S. Appl. No. 13/707,532 Office Action mailed Jun. 24, 2014.

(Continued)

*Primary Examiner* — Mazda Sabouri
(74) *Attorney, Agent, or Firm* — Hartman & Citrin LLC

(57) ABSTRACT

Concepts and technologies are described herein for a hybrid network-based and device-based intelligent radio access control. According to one aspect disclosed herein, a radio access technology ("RAT") selection system and a mobile device cooperate to enable an intelligent multi-radio access control that can select a RAT that is best-suited for the mobile device. The RAT selection system can select networks based upon network conditions, policies, user profiles, applications, and/or other information, and provide a list of the networks to the mobile device. The mobile device can utilize local device information to select a network from the list. In this manner, the RAT selection system and the mobile device can cooperate to steer traffic to various networks operating in accordance with different RATs to improve user experience, especially in network traffic congested areas, and to efficiently leverage network resources for mobile telecommunications and WI-FI networks.

20 Claims, 6 Drawing Sheets

(56) References Cited

U.S. PATENT DOCUMENTS

| | | |
|---|---|---|
| 7,146,130 B2 | 12/2006 | Hsu et al. |
| 7,299,019 B1 | 11/2007 | Austin et al. |
| 7,400,600 B2 | 7/2008 | Mullany et al. |
| 7,400,886 B2 | 7/2008 | Sahim et al. |
| 7,440,755 B2 | 10/2008 | Balachandran |
| 7,496,060 B2 | 2/2009 | Ramirez et al. |
| 7,508,781 B2 | 3/2009 | Liu et al. |
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulos |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 2002/0123365 A1 | 9/2002 | Thorson et al. |
| 2003/0078075 A1 | 4/2003 | McNicol |
| 2003/0117953 A1 | 6/2003 | Kinahan et al. |
| 2004/0165538 A1 | 8/2004 | Swami |
| 2005/0227696 A1 | 10/2005 | Kaplan et al. |
| 2006/0128394 A1 | 6/2006 | Turina et al. |
| 2006/0166677 A1 | 7/2006 | Derakshan et al. |
| 2006/0199608 A1* | 9/2006 | Dunn et al. ............... 455/552.1 |
| 2007/0026854 A1 | 2/2007 | Nath |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1 | 11/2007 | Hande et al. |
| 2007/0286092 A1* | 12/2007 | Famolari et al. ............. 370/252 |
| 2008/0144577 A1 | 6/2008 | Huang et al. |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1* | 10/2009 | Vigue et al. ................. 370/254 |
| 2010/0048205 A1 | 2/2010 | Guilford et al. |
| 2010/0056153 A1 | 3/2010 | Attar et al. |
| 2010/0056181 A1 | 3/2010 | Rippon et al. |
| 2010/0110890 A1 | 5/2010 | Rainer et al. |
| 2010/0136978 A1 | 6/2010 | Cho et al. |
| 2010/0149971 A1 | 6/2010 | Noriega |
| 2010/0234021 A1 | 9/2010 | Ngai et al. |
| 2010/0234042 A1* | 9/2010 | Chan et al. .................. 455/453 |
| 2010/0255849 A1 | 10/2010 | Ore |
| 2010/0267384 A1* | 10/2010 | Dwyer et al. ............... 455/435.2 |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1 | 12/2010 | Mueck et al. |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0105120 A1 | 5/2011 | Abdel-Samad |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1 | 7/2011 | Yang et al. |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1 | 8/2012 | Bienas |
| 2012/0214525 A1 | 8/2012 | Fujii et al. |
| 2012/0236717 A1 | 9/2012 | Saska et al. |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1 | 1/2013 | Dimou et al. |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1 | 2/2013 | Lee et al. |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143543 A1* | 6/2013 | Kovvali et al. ............... 455/418 |
| 2013/0155849 A1 | 6/2013 | Koodli et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 | 7/2013 | Zhuang et al. |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0029420 A1 | 1/2014 | Jeong et al. |
| 2014/0092306 A1 | 4/2014 | Lee et al. |
| 2014/0092734 A1 | 4/2014 | Ljung |
| 2014/0099945 A1 | 4/2014 | Singh et al. |
| 2014/0128074 A1 | 5/2014 | Vangala et al. |
| 2014/0141785 A1 | 5/2014 | Wang et al. |
| 2014/0161256 A1 | 6/2014 | Bari et al. |
| 2014/0204745 A1 | 7/2014 | Nuss |
| 2014/0247810 A1 | 9/2014 | Bontu et al. |
| 2014/0274066 A1 | 9/2014 | Fodor et al. |
| 2014/0335870 A1 | 11/2014 | Yilmaz et al. |
| 2015/0208280 A1 | 7/2015 | Lorca Hernando |
| 2015/0244520 A1 | 8/2015 | Kariman et al. |

(56) References Cited

U.S. PATENT DOCUMENTS

FOREIGN PATENT DOCUMENTS

| EP | 2197228 | 12/2011 |
| --- | --- | --- |
| EP | 2533571 | 12/2012 |
| EP | 2632072 | 8/2013 |
| EP | 2603046 | 12/2013 |
| WO | WO 2010/130134 | 11/2010 |
| WO | WO 2011/053204 | 5/2011 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Office Action mailed Mar. 12, 2014 in U.S. Appl. No. 13/707,551.
Office Action mailed Apr. 7, 2014 in U.S. Appl. No. 13/681,141.
U.S. Office Action dated Nov. 17, 2014 in U.S. Appl. No. 13/707,535.
U.S. Office Action dated Dec. 24, 2014 in U.S. Appl. No. 13/707,531.
U.S. Office Action dated Dec. 10, 2014 in U.S. Appl. No. 13/707,551.
U.S. Office Action dated Dec. 24, 2014 U.S. Appl. No. 13/707,538.
U.S. Office Action dated Jan. 22, 2015 in U.S. Appl. No. 13/707,539.
U.S. Office Action dated Jan. 22, 2015 in U.S. Appl. No. 14/059,041.
U.S. Appl. No. 13/707,531, filed Dec. 6, 2012.
U.S. Appl. No. 13/707,551, filed Dec. 6, 2012.
U.S. Appl. No. 13/707,532, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
Office Action mailed Jun. 27, 2012 in U.S. Appl. No. 12/946,611.
Office Action mailed Mar. 22, 2012 in U.S. Appl. No. 12/946,611.
Office Action mailed Mar. 13, 2012 in U.S. Appl. No. 12/624,643.
Notice of Allowance mailed Aug. 8, 2012 in U.S. Appl. No. 12/624,643.
Office Action mailed Apr. 22, 2013 in U.S. Appl. No. 13/681,141.
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026, 3GPP TSG-RAN3 Meeting #73, Athens, Greece, Aug. 22-26, 2011 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996):82-90. http://inrg.csie.ntu.edu.tw/course/wms/paper/Pollin96.pdf.
Office Action mailed Sep. 13, 2013 in U.S. Appl. No. 13/681,141.
Notice of Allowance mailed Nov. 2, 2012 in U.S. Appl. No. 12/946,611.
Raza, Syed Numan, "LTE Performance Study," Master of Science Thesis, Feb. 9, 2012.
Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Appl. No. 14/520,020, filed Oct. 21, 2014.
U.S. Office Action dated Mar. 24, 2015 in U.S. Appl. No. 13/707,551.

(56) References Cited

OTHER PUBLICATIONS

U.S. Office Action dated Feb. 19, 2015 in U.S. Appl. No. 14/084,578.
U.S. Office Action dated May 12, 2015 in U.S. Appl. No. 13/707,535.
U.S. Office Action dated Jul. 9, 2015 in U.S. Appl. No. 13/707,531.
U.S. Office Action dated Jul. 1, 2015 in U.S. Appl. No. 13/707,538.
U.S. Office Action dated Jun. 17, 2015 in U.S. Appl. No. 14/084,578.
U.S. Office Action dated May 11, 2015 in U.S. Appl. No. 14/064,329.
U.S. Office Action dated May 19, 2015 in U.S. Appl. No. 14/035,584.
U.S. Office Action dated Sep. 17, 2015 in U.S. Appl. No. 13/707,539.
U.S. Office Action dated Sep. 18, 2015 in U.S. Appl. No. 14/520,020.
U.S. Office Action dated Sep. 30, 2015 in U.S. Appl. No. 13/707,551.
U.S. Office Action dated Sep. 30, 2015 in U.S. Appl. No. 13/707,535.
U.S. Office Action dated Feb. 25, 2016 in U.S. Appl. No. 13/707,535.
U.S. Office Action dated Apr. 14, 2016 in U.S. Appl. No. 13/707,551.
U.S. Office Action dated Nov. 16, 2015 in U.S. Appl. No. 13/707,531.
U.S. Notice of Allowance dated Nov. 13, 2015 in U.S. Appl. No. 13/707,538.
U.S. Notice of Allowance dated Dec. 14, 2015 in U.S. Appl. No. 14/035,584.
U.S. Office Action dated Aug. 12, 2016 in U.S. Appl. No. 13/707,551.
U.S. Office Action dated Oct. 6, 2016 in U.S. Appl. No. 13/707,539.

\* cited by examiner

US 9,544,841 B2

HYBRID NETWORK-BASED AND DEVICE-BASED INTELLIGENT RADIO ACCESS CONTROL

TECHNICAL FIELD

The concepts and technologies disclosed herein generally relate to wireless telecommunications. More specifically, the concepts and technologies disclosed herein relate to hybrid network-based and device-based intelligent radio access control in wireless telecommunications networks.

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for a hybrid network-based and device-based intelligent radio access control. According to one aspect disclosed herein, a radio access technology ("RAT") selection system and a mobile device cooperate to enable an intelligent multi-radio access control that can select a RAT that is best-suited for the mobile device based upon, for example, a per application and/or service basis. The radio access technology ("RAT") selection system can select networks based upon network conditions, policies, user profiles, and/or other information, and provide a list of the networks to the mobile device. The mobile device can utilize local device information to select a network from the list. In this manner, the RAT selection system and the mobile device can cooperate to steer traffic to various networks operating in accordance with RATs to improve user experience, especially in network traffic congested areas, and to efficiently leverage network resources for mobile telecommunications and WI-FI networks.

According to one aspect disclosed herein, a mobile device includes a processor and a memory. The memory can include computer-executable instructions that, when executed by the processor, cause the processor to perform operations. The operations can include receiving a priority list that specifies a priority order in which to select multiple radio access networks ("RANs") that the mobile device is capable of connecting to. In some embodiments, the RANs operate in accordance with multiple RATs. The operations can also include obtaining local device information, selecting a RAN of the plurality of RANs based upon the priority list and the local device information, and connecting to the selected RAN.

According to another aspect disclosed herein, a RAT selection system includes a processor and memory including instructions that, when executed by the processor, cause the processor to perform operations. The operations can include receiving a policy rule, receiving network load information for multiple RANs that a target mobile device is capable of connecting to, generating, based upon the policy rule and the network load information, a priority list specifying a priority order in which the target mobile device should select the RANs, and sending the priority list to the target mobile device for use in a determination regarding which RAN to connect to. The mobile device utilizes local device information to select a RAN from the list.

According to another aspect disclosed herein, a method for selecting a RAN includes operations performed by a mobile device. The operations can include receiving a priority list that specifies a priority order in which to select multiple RANs that the mobile device is capable of connecting to, obtaining local device information, selecting a RAN based upon the priority list and local device information, and connecting to the selected RAN.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
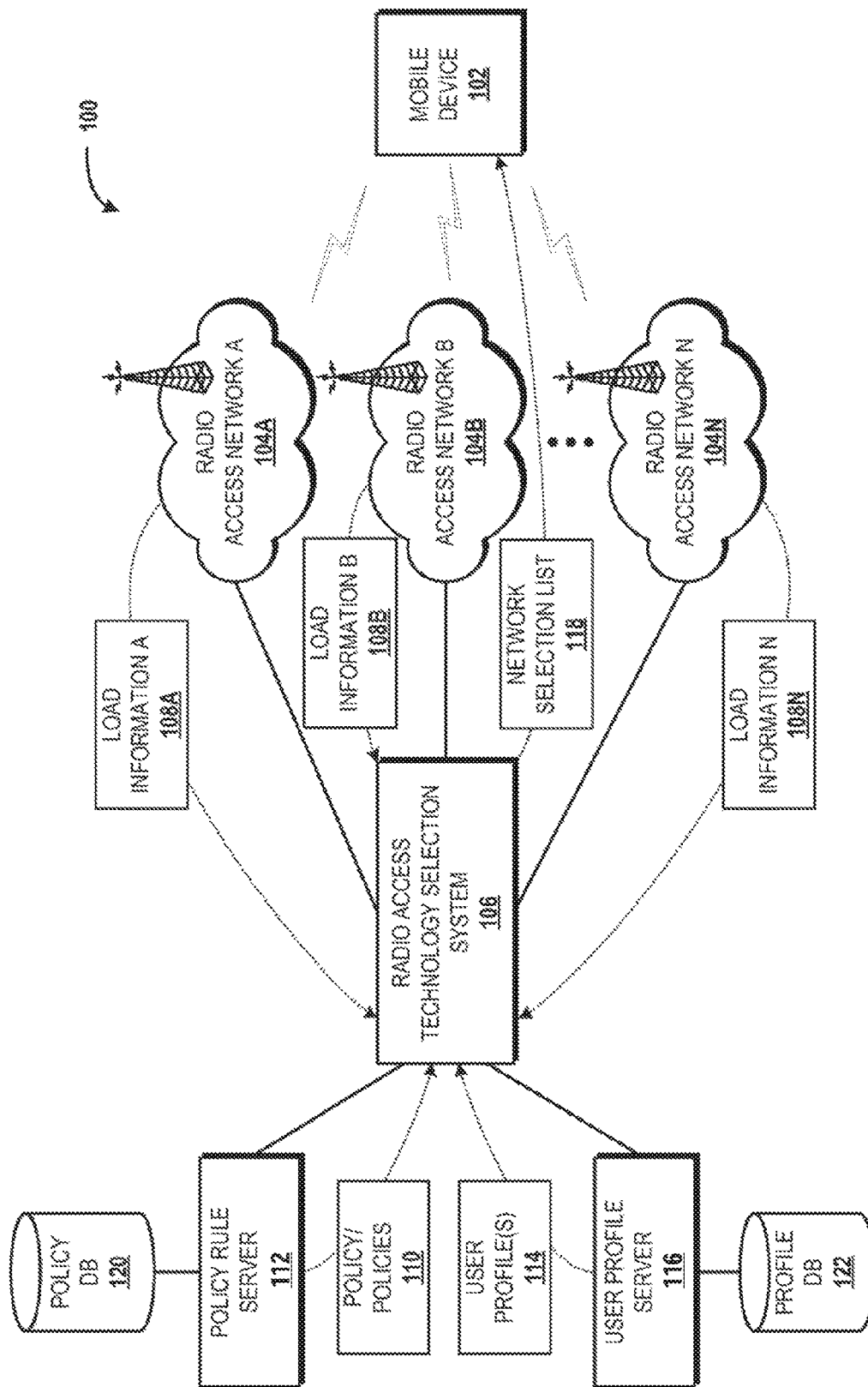
FIG. 1 is a block diagram illustrating aspects of an illustrative operating environment for various concepts disclosed herein.

Concepts and technologies are described herein for a hybrid network-based and device-based intelligent radio access control. According to one aspect disclosed herein, a radio access technology ("RAT") selection system and a mobile device cooperate to enable an intelligent multi-radio access control that can select a RAT that is best-suited for the mobile device. The RAT selection system can select networks based upon network conditions, policies, user profiles, and/or other information, and provide a list of the networks to the mobile device. The mobile device can utilize local device information to select one or more networks (e.g., one cellular and one WI-FI) from the list. In some embodiments, the mobile device can route its traffic to the selected network(s) based upon one or more applications. In this manner, the RAT selection system and the mobile device can cooperate to steer traffic to various networks operating in accordance with different RATs to improve user experience, especially in network traffic congested areas, and to efficiently leverage network resources for mobile telecommunications and WI-FI networks.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of hybrid network-based and device-based intelligent radio access control will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is configured to connect to and communicate with a plurality of radio access networks ("RANs") 104A-104N (hereinafter, at times, referred to collectively or generically as "RANs 104") for voice and/or data communications between the mobile device 102 and one or more other mobile devices, computers, servers, networking devices, and/or networks (not shown). Although in the illustrated example, the mobile device 102 is shown as being in communication with three RANs, the mobile device 102 may be in communication with any number of RANs, and, at times, may be in simultaneous communication with multiple RANs.

The mobile device 102 may be a cellular phone, a feature phone, a smartphone, a mobile computing device, a tablet computing device, a portable television, a portable video game console, or any other computing device that is configured to connect to and communicate with one or more of the RANs 104 via one or more radio access components. In some embodiments, the mobile device 102 includes an integrated or external radio access component that facilitates wireless communication with one or more of the RANs 104. The radio access component may be a cellular telephone that is in wired or wireless communication with the mobile device 102 to facilitate a tethered data connection to one or more of the RANs 104. Alternatively, the access component includes a wireless transceiver configured to send data to and receive data from one or more of the RANs 104 and a universal serial bus ("USB") or another communication interface for connection to the mobile device 102 so as to enable tethering. In any case, the mobile device 102 can wirelessly communicate with one or more of the RANs 104 over a radio/air interface in accordance with one or more radio access technologies ("RATs"). The mobile device 102 may also initiate, receive, and/or maintain voice calls with one or more other voice-enabled telecommunications devices such as other mobile devices or landline devices (not shown). The mobile device 102 may also exchange Short Message Service ("SMS") messages, Multimedia Message Service ("MMS") messages, email, and/or other messages with other devices (not shown).

Each of the RANs 104 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. Each of the RANs 104 can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile device 102. Data communications can be provided in part by the RANs 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

Each of the RANs 104 may be a GSM RAN ("GRAN"), a GSM EDGE RAN ("GERAN"), a UMTS Terrestrial Radio Access Network ("UTRAN"), an E-UTRAN, any combination thereof, and/or the like. As such, each of the RANs 104 may include one or more base transceiver stations ("BTSs"), one or more Node Bs, one or more eNodeBs, and/or the like. As used herein, a "base station" refers to a radio receiver and/or transmitter (collectively, transceiver) that are configured to provide a radio/air interface by which one or more mobile devices, such as the mobile device 102, can connect to a network. Accordingly, base station encompasses all the aforementioned networking nodes that are capable of provide a radio/air interface regardless of the technologies utilized to do so. Moreover, a base station can be in communication with one or more antennas, each of which may be configured in accordance with any antenna design specifications to provide a physical interface for receiving and transmitting radio waves to/from a network.

The RANs 104 can be part of one or more mobile telecommunications networks. As used herein, a mobile telecommunications network includes one or more RANs and a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the mobile device 102. Moreover, a mobile telecommunications network can provide a connection to the Internet or other WAN so that the mobile device 102 can access Internet content such as Websites, streaming media, online video games, downloadable content, and the like.

In addition to or as an alternative to operating in accordance one or more mobile telecommunications standards, one or more of the RANs 104 may operate in accordance with one or more Institute of Electrical and Electronic Engineers ("IEEE") 802.11 standards such as IEEE 802.11a, 802.11b, 802.11g, 802.11n, and/or future 802.11 standard (referred to herein collectively as "WI-FI"). Draft 802.11 standards are also contemplated. A WI-FI network may be implemented utilizing one or more wireless WI-FI access points. In some implementations, one or more of the wireless WI-FI access points is a mobile device or other computing device that functions as a WI-FI hotspot. In some implementations, the mobile device 102 connects to a WI-FI network facilitated in part by one or more of the RANs 104 via one or more secure connections, each of which may utilize an encryption technology such as, but not limited to, WI-FI Protected Access ("WPA"), WPA2, Wired Equivalent Privacy ("WEP"), and/or the like. Moreover, a WI-FI network can provide a connection to the Internet or other WAN so that the mobile device 102 can access Internet content such as Websites, streaming media, online video games, downloadable content, and the like.

As used herein, a RAT can refer to any mobile telecommunications standard or draft standard thereof, any IEEE 802.11 standard or draft standard thereof, or any other technology by which a mobile device, such as the mobile device 102, can wirelessly access a network, such as one or more of the RANs 104.

The operating environment 100 also includes a RAT selection system 106. The RAT selection system 106 is configured to cooperate with one or more mobile devices, such as the mobile device 102, to enable an intelligent multi-radio access control that can select one or more RATs that are best-suited for the mobile device(s) based upon network conditions, policies, user profiles, local device information, and/or other information. More particularly, the RAT selection system 106 is configured to generate a list of networks based upon network conditions, policies, user profiles, and/or other information. In some embodiments, the list of networks includes a prioritized list of networks. The RAT selection system 106 is also configured to provide the list of networks to the mobile device, which uses local device information to select a network from the list and connect to the selected network. In this manner, the RAT selection system 106 can cooperate with the mobile devices, such as the mobile device 102, to steer traffic to various networks operating in accordance with different RATs to improve user experience, especially in network traffic congested areas, and to efficiently leverage network resources for mobile telecommunications and WI-FI networks. These and other aspects of the RAT selection system 106 and the mobile device 102 will be described in greater detail below.

In the illustrated example, the RAT selection system 106 is configured to receive load information 108A-108N (hereinafter, at times, referred to collectively or generically as "load information 108") from the RANs 104, and utilize the load information 108 at least in part to determine which RAN(s) of the RANs 104 the mobile device 102 should connect to. In addition to the load information 108, the RAT selection system 106 can utilize one or more policies 110 received from a policy rule server 112 and/or one or more user profiles 114 received from a user profile server 116 in determining which RAN(s) of the RANs 104 the mobile device 102 should connect to. The RAT selection system 106 can generate a network selection list 118 that includes an identification of the RAN(s) and, potentially, one or more policy rules to use these RANs that the mobile device 102 should connect to, and can send the network selection list 118 to the mobile device 102. The mobile device 102 can connect to one or more of the RANs 104 based upon the RAN(s) identified in the network selection list 118 and local device information. The mobile device 102 can also utilize local device information such as, but not limited to, mobility state information, performance measurement information, battery utilization information, channel quality information, application(s), and/or a user override selection, in determining which of RAN(s) of the RANs 104 to connect to.

The network selection list 118 can specify an order in which to select the RANs 104. It should be understood that the order in which the RAT selection system 106 specifies RANs to be selected is not intended to imply that the mobile device 102 must select each of the RANs, but that the RAT selection system 106 has specified the order as a preferred order or priority order in which to select the RANs based upon information available to the RAT selection system 106. The local device information can aid the mobile device 102 in selecting a RAN from the network selection list 118. In some implementations, for example, the selected RAN is the most preferred or highest priority RAN on the network selection list 118. In some other implementations, for example, the selected RAN is the least preferred or lowest priority RAN on the network selection list 118. Other implementations may include the mobile device 102 selecting a RAN from the network selection list 118 that is between a most preferred or highest priority RAN and a least preferred or lowest priority RAN based upon the local device information. Accordingly, the network selection list 118 is intended to provide a list of recommendations to the mobile device 102 for making a determination as to which RAN to connect to, while the mobile device 102 is capable of weighting the recommendations provided in the network selection list 118 with the local device information to determine which RAN to select.

In some embodiments, the load information 108 includes historic network load information. Historic network load information is used herein to describe data obtained by the RAT selection system 106 based upon network load experienced by one or more of the RANs 104 in the past or otherwise in non-real-time. In some embodiments, historic network load information is utilized by the RAT selection system 106 to identify one or more network load trends experienced by a RAN over a specified period of time. This trending network load information can be useful to the RAT selection system 106 to predict times during which network load is favorable or not to support communications from additional mobile devices, such as the mobile device 102.

In some other embodiments, the load information 108 includes current network load information. Current network load data is used herein to describe network load data that is obtained by the RAT selection system 106 based upon a network load experienced by one or more of the RANs 104 in real-time or near real-time. Real-time, in this context, is the actual time during which a network load is experienced by one or more of the RANs 104. Near real-time, in this context, is the actual time during which a network load is experienced by a RAN plus a delay on the order of seconds, minutes, or some order of magnitude thereof, for example.

What constitutes near-real time network load information versus historic network load information can be defined by the owner and/or operator of the RAT selection system 106, a service provider providing service via one or more of the RANs 104, and/or another entity. It should be understood that real-time network load information associated with a real-time network load information of one or more of the RANs 104 and near real-time network load information associated with a near real-time network load of one or more of the RANs 104 might be received by the RAT selection system 106 with delay caused by latency and/or other network phenomena. Moreover, this delay may increase with the additional time needed to provide the load information 108 to the RAT selection system 106.

In the illustrated embodiment, the policies 110 are stored in a policy database 120 with any number of other policies. The policy database 120 may be separate from and in communication with the policy server 112 as in the illustrated embodiment, or alternatively may be provided as part of the policy server 112. In any case, the policy server 112 can obtain the policies 110 from the policy database 120 and send the policies 110 to the RAT selection system 106 in response to a request received from the RAT selection system 106, periodically, or in response to an event, such as a change to one or more of the policies 110.

As used herein, the term "policy" refers to one or more settings, one or more configurations, one or more rules, and/or the like that define, at least in part, one or more courses or methods of action in light of one or more conditions to be used in a determination made by the RAT selection system 106 regarding which RAN(s) of the RANs 104 the mobile device 102 and/or other mobile devices should connect to. In some embodiments, a policy includes one or more rules that specify one or more if-then conditions by which to handle a particular situation, such as redirecting network traffic based upon network load experienced by one or more of the RANs 104 and reported to the RAT selection system 106 as part of the load information 108, applications, time-of-day, locations, combinations thereof, and the like. In some other embodiments, a policy includes one or more matrices of cause and effect conditions, tables of actions, or the like for responding to or otherwise dealing with certain stimuli, such as network conditions evidenced by the load information 108, the user profiles 114, and/or other stimuli.

Also in the illustrated embodiment, the user profiles 114 can be stored in a profile database 122 with any number of other user profiles. The profile database 122 may be separate from and in communication with the user profile server 116 as in the illustrated embodiment, or alternatively may be provided as part of the user profile server 116. In any case, the user profile server 116 can obtain the user profiles 114 in response to a request received from the RAT selection system 106, periodically, or in response to an event, such as a change to one or more of the user profiles 114.

As used herein, the term "user profile" refers to a collection of data associated with a user that accesses one or more of the RANs 104 via a device such as the mobile device 102. A user in this context refers to an individual or other entity. A user profile can define information regarding a service agreement between a user and one or more service providers that provide telecommunications service, at least in part, via one or more of the RANs 104. The service agreement may include terms of service for pre-paid and/or post-paid service. The service agreement may include terms of roaming agreements between two or more mobile telecommunications carriers. The service agreement may define a service tier for the user. A service tier may establish a priority for a user in regard to utilizing network resources to connect to one or more of the RANs 104 via the mobile device 102.

In some embodiments, the RAT selection system 106 is owned and/or operated by an owner and/or operator of one or more of the RANs 104. In some embodiments, the policy server 112 is owned and/or operated by an owner and/or operator of one or more of the RANs 104. In some embodiments, the user profile server 116 is owned and/or operated by an owner and/or operator of one or more of the RANs 104. In some embodiments, the RAT selection system 106 includes the policy server 112 and/or the user profile server 116.

It should be understood that some implementations of the operating environment 100 include multiple mobile devices 102, multiple RAT selection systems 106, multiple policy servers 112, multiple policy databases 120, multiple user profile servers 116, and/or multiple profile databases 122. Moreover, the RAT selection system 106, the policy server 112, and/or the user profile server 116 may be provided as part of one or more distributed computing systems. Thus, the illustrated embodiment should be understood as being illustrative, and should not be construed as being limiting in any way.

Figure 2:
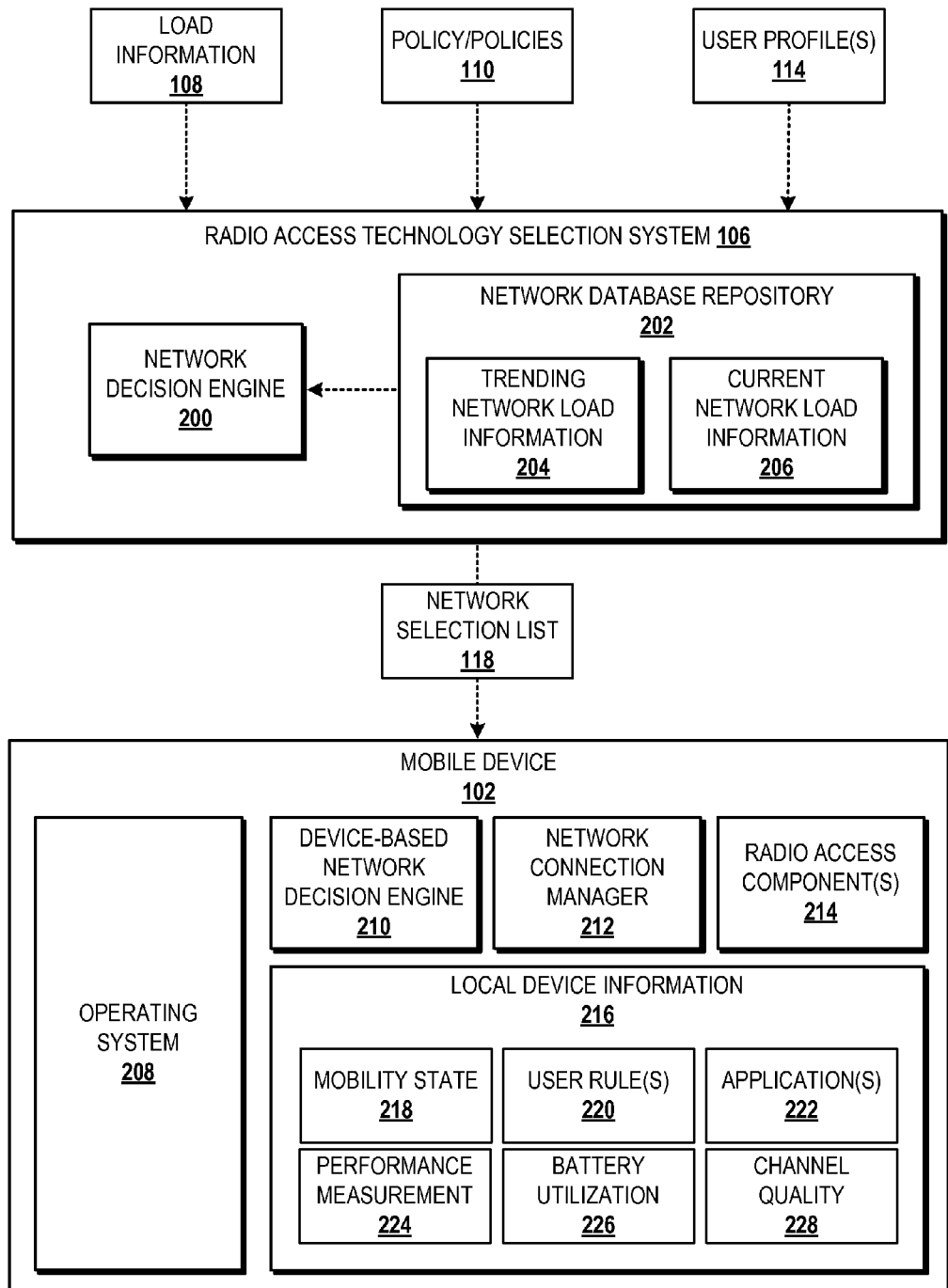
FIG. 2 is a block diagram illustrating aspects of a radio access technology selection system configured to select a radio access network and provide the network selection to a mobile device configured to connect to the selected radio access network, according to an illustrative embodiment.

Turning now to FIG. 2, a block diagram illustrating additional aspects of the RAT selection system 106 and the mobile device 102 will be described, according to an illustrative embodiment. In the illustrated embodiment, the RAT selection system 106 is configured to receive the load information 108, the policies 110, and the user profiles 114, utilize at least some of this information to determine which of the RANs 104 the mobile device 102 should connect to, and provide the selection of one or more of the RANs 104 to the mobile device 102 in the network selection list 118. The illustrated RAT selection system 106 includes a network decision engine 200 and a network database repository 202, both of which will now be described in greater detail.

The network decision engine 200 utilizes the load information 108, the policies 110, the user profiles 114, or any combination thereof, to make a determination regarding which of the RAN(s) 104 the mobile device 102 should connect to. In some embodiments, the network decision engine 200 is an application program that includes computer-executable instructions that, when executed by one or more processors of the RAT selection system 106, cause the RAT selection system 106 to analyze the load information 108, the policies 110, and the user profiles 114, alone or in any combination, to select one or more of the RANs 104, and instruct the mobile device 102, and possibly one or more other target devices, to connect to the selected RAN(s) via the network selection list 118.

The network database repository 202 includes trending network load information 204 for one or more of the RANs 104 and current network load information 206 for one or more of the RANs 104. In some embodiments, the trending network load information 204 is received from one or more of the RANs 104 via periodic network load updates, such as every fifteen minutes or other time period. In some embodiments, the current network load information 206 is received from one or more of the RANs 104 in an event-driven network load update. An event-driven network load update may be triggered at a RAN due to the network load experienced by that RAN meeting or exceeding a pre-defined network load threshold. In some embodiments, the RAT selection system 106 can request the current network load information 206 if needed by the network decision engine 200 to select one or more of the RANs 104. The network load information 108 can include network load information received via periodic network load updates and event-driven network load updates. It should be understood, however, that some implementations may utilize only the trending network load information 204 or only the current network load information 206. It should also be understood that although the network database repository 202 is shown as being included in the RAT selection system 106, the network database repository 202 may be external to and in communication with the RAT selection system 106. In these implementations, the network database repository 202 may receive the load information 108 and provide the load information 108 to the RAT selection system 106 via one or more wired or wireless communication links.

The mobile device 102 illustrated in FIG. 2 includes an operating system 208, a device-based network decision manager 210, a network connection manager 212, one or more radio access components 214, and local device information 216. The operating system 208 is a program for controlling the operation of the mobile device 102. The operating system 208 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The device-based network decision engine 210 utilizes the network selection list 118 and the local device information 216 to determine which network(s) the mobile device 102 should connect to. In some embodiments, the device-based network decision engine 210 is an application program that includes computer-executable instructions that, when executed by one or more processors of the mobile device 102, cause the mobile device 102 to analyze the network selection list 118 and the local device information 216 to select one or more of the RANs 104, and to instruct the mobile device 102, and more particularly, the network connection manager 212, to connect to the selected RAN(s).

The network connection manager 212 can be configured to manage all or a portion of the network connections available to the mobile device 102 at a given time, including, for example, connections established via one or more WI-FI radios and/or one or more cellular radios of the mobile device 102, such as one or more of the radio access components 214. In some embodiments, the network connection manager 212 is included as part of the operating system 208 and/or another application stored on the mobile device 102 such as the device-based network decision engine 210.

The illustrated local device information 216 includes mobility state information 218, one or more user rules 220, one or more applications 222, performance measurement information 224, battery utilization information 226, and channel quality information 228. These types of local device information are merely illustrative of some contemplated information that may be used in accordance with various embodiments of the concepts and technologies described herein for selecting a network and therefore should not be construed as being limiting in any way.

The mobility state information 218 can include the speed at which the mobile device 102 is currently moving, a movement pattern of the mobile device 102, and/or any other information associated with movement or non-movement of the mobile device 102. The mobility state information 218 may be obtained by an accelerometer, a Global Positioning System ("GPS") component, and/or other motion sensor or component of the mobile device 102. The mobility state information 218 can be utilized by the device-based network decision engine 210 to determine if it is appropriate for the mobile device 102 to connect to a network given the movement or non-movement of the mobile device 102. For example, if the mobility state information 218 indicates that the mobile device 102 is moving at 60 miles per hour and a WI-FI network is available to the mobile device 102, the device-based network decision engine 210 can determine to forgo connecting to the WI-FI network based upon the relatively fast movement of the mobile device 102 and the prediction that the mobile device 102 will not be within range of the WI-FI network for a sufficient amount of time to handle voice and/or data communications between the mobile device 102 and the WI-FI network. Alternatively, for example, if the mobility state information 218 indicates that the mobile device is stationary and a WI-FI network is available to the mobile device 102, the device-based network decision engine 210 can determine to connect to the WI-FI network based upon the stationary state of the mobile device 102 and the prediction that the mobile device 102 will be within range of the WI-FI network for a sufficient amount of time to handle voice and/or data communications between the mobile device 102 and the WI-FI network.

The user rule(s) 220 can include rules specified by or for a user of the mobile device 102 regarding network selections. For example, a user rule may specify an override selection of a network that should be selected if the network is available. An override selection can be conditional. In some embodiments, the user rule(s) 220 are overridden by the policies 110.

The application(s) 222 can include an indication of one or more applications that are currently utilizing or starting to utilize processing and/or memory resources of the mobile device 102 and/or one or more of the RANs 104. In some embodiments, information regarding the application(s) 222 is received by the device-based network decision engine 210 from the operating system 208, and more particularly, a resource management function of the operating system 208. The device-based network decision engine 210 can utilize the application(s) 222 to select a network that is capable of voice and/or data communications originating from or directed to the application(s) 222. For example, if a video streaming application is active or being initiated on the mobile device 102, the device-based network decision engine 210 can determine to select a network that has sufficient bandwidth resources to support streaming video to the mobile device 102. The application(s) 222 can additionally or alternatively include an indication of one or more application that are currently installed on the mobile device 102.

The performance measurement information 224 can include round-trip time ("RTT"), throughput, latency, packet loss, and/or other performance measurements obtained by the mobile device 102. In some embodiments, the mobile device 102 is configured to perform one or more tests to obtain the performance measurement information 224. The tests may be performed by standalone test applications executing on the mobile device 102, the operating system 208, the device-based network decision engine 210, and/or the network connection manager 212. By way of example and not limitation, illustrative tests include throughput tests, latency tests, call tests, SMS tests, multiple radio access bearer ("mRAB") tests (e.g., simultaneous voice and data tests), voice over Internet protocol ("VoIP"), video mean opinion score ("MOS"), or idle tests.

The battery utilization information 226 can include information such as, but not limited to, a current, a voltage, a temperature, a percentage of battery used, a percentage of battery remaining, a battery condition, a remaining time, and a remaining capacity (e.g., in watt hours). In some embodiments, the battery utilization information 226 is obtained from a battery gauge of the mobile device 102 that is configured to measure the effect of a battery's discharge rate, temperature, age, and/or other factor to predict the remaining life within a certain percentage of error.

The channel quality information 228 can include a channel quality indicator ("CQI") or other measurement that is indicative of the quality of a given channel over which the mobile device 102 can communicate. In some embodiments, a CQI is calculated based at least in part upon the channel quality information 228 includes a signal-to-noise ("SNR"), a signal-to-interference plus noise ratio ("SINR"), a signal-to-noise plus distortion ratio ("SNDR"), and/or the like for a given channel.

Figure 3:
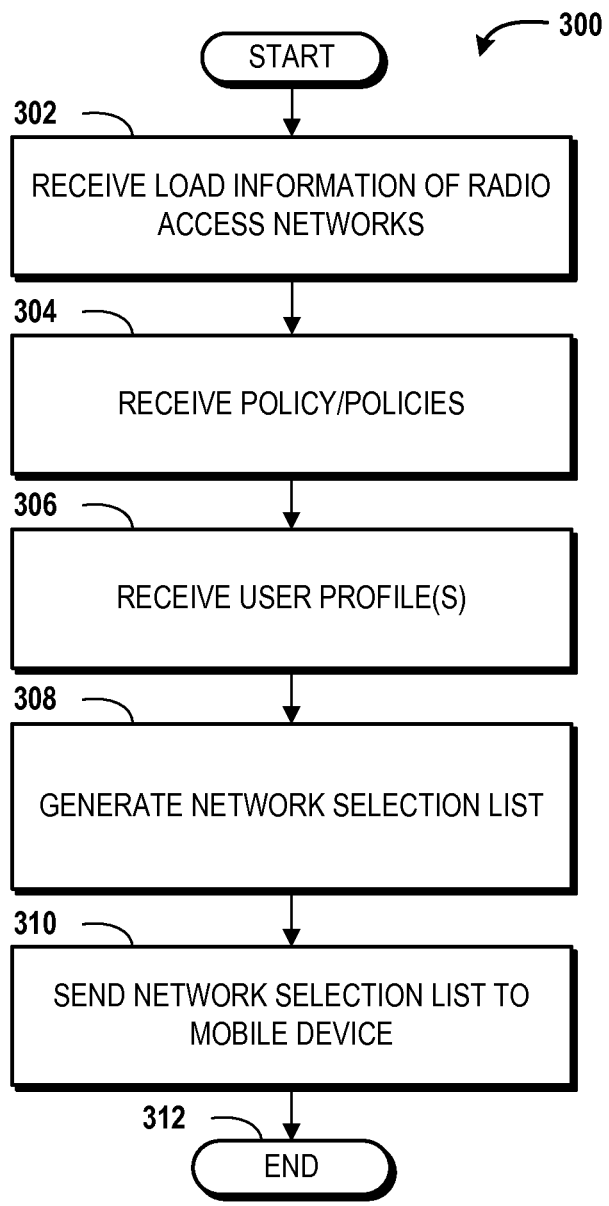
FIG. 3 is a flow diagram illustrating aspects of a method for generating a network selection list for use by one or more target mobile devices in selecting a radio access network to connect to, according to an illustrative embodiment.

Turning now to FIG. 3, a flow diagram illustrating aspects of a method 300 for generating a network selection list for use by one or more target mobile devices in selecting a RAN to connect to will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like. As used herein, "cause a processor to perform operations" includes causing a processor of a computing system or computing device such as the mobile device 102, the RAT selection system 106, the policy server 112, or the user profile server 116, to perform one or more operations of the operations and/or causing the processor to direct other components of the computing system or device to perform one or more of the operations.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 300 begins and proceeds to operation 302, wherein the RAT selection system 106 receives network load information for a plurality of RANs 104. From operation 302, the method 300 proceeds to operation 304, wherein the RAT selection system 106 receives one or more policies 110 from the policy server 112. From operation 304, the method 300 proceeds to operation 306, wherein the RAT selection system 106 receives one or more user profiles 114 from the user profile server 116.

At operation 308, the RAT selection system 106 selects RANs 104 based upon the policies 110, the user profiles 114, and/or the network load information 108, and generates a network selection list 118. In some embodiments, the RAT selection system 106 utilizes the policies 110, the user profiles 114, and/or the network load information 108 to establish a priority among the RANs 104 included in the network selection list 118. From operation 308, the method 300 proceeds to operation 310, wherein the RAT selection system 106 sends the network selection list 118 to one or more target mobile devices 102 to instruct the target mobile device 102 to connect to a network identified in the network selection list 118 based upon an analysis of the networks included in the network selection list 118 and local device information 216 known to the target mobile device(s) 102. In some embodiments, the RAT selection system 106 also sends one or more policy rules, including one or more of the policies 110 and/or derivations thereof, to the mobile device 102 for use by the mobile device 102 in selecting one or more of the recommended networks. From operation 310, the method 300 proceeds to operation 312, wherein the method 300 may end.

Figure 4:
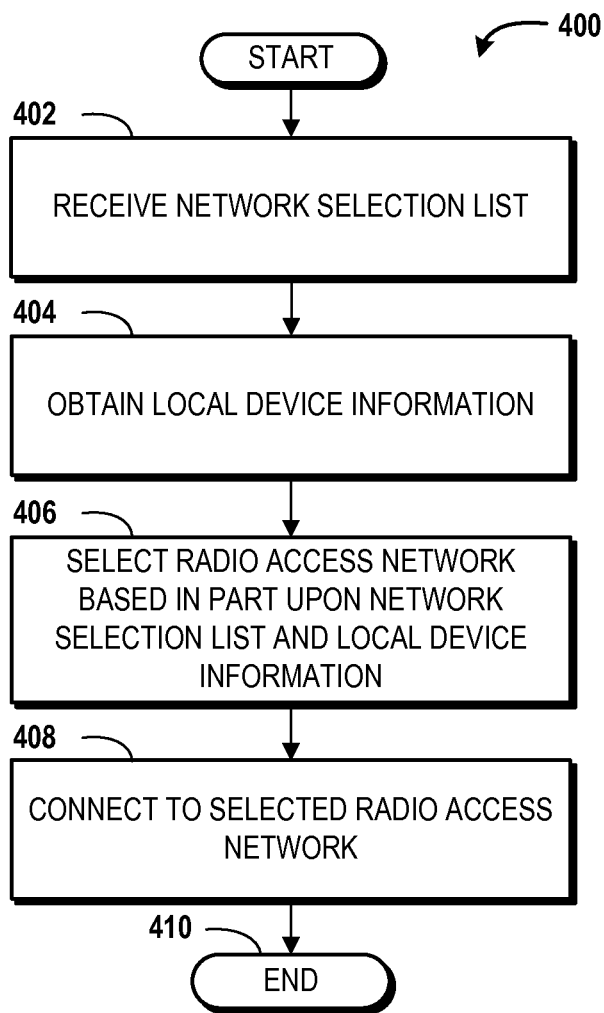
FIG. 4 is a flow diagram illustrating aspects of a method for selecting a RAN from a network selection list based upon local device information known to a target mobile device, according to an illustrative embodiment.

Turning now to FIG. 4, a flow diagram illustrating aspects of a method 400 for selecting a RAN from a network selection list based upon local device information known to a target mobile device will be described, according to an illustrative embodiment. The method 400 begins and proceeds to operation 402, wherein the mobile device 102 receives the network selection list 118 from the RAT selection system 106. From operation 402, the method 400 proceeds to operation 404, wherein the mobile device 102 obtains local device information such as at least a portion of the local device information 216. From operation 404, the method 400 proceeds to operation 406, wherein the mobile device 102 selects a RAN from the network selection list 118 based upon the local device information 216. From operation 406, the method 400 proceeds to operation 408, wherein the mobile device 102 connects to the network selected at operation 406. From operation 408, the method 400 proceeds to operation 410, wherein the method 400 may end.

Figure 5:
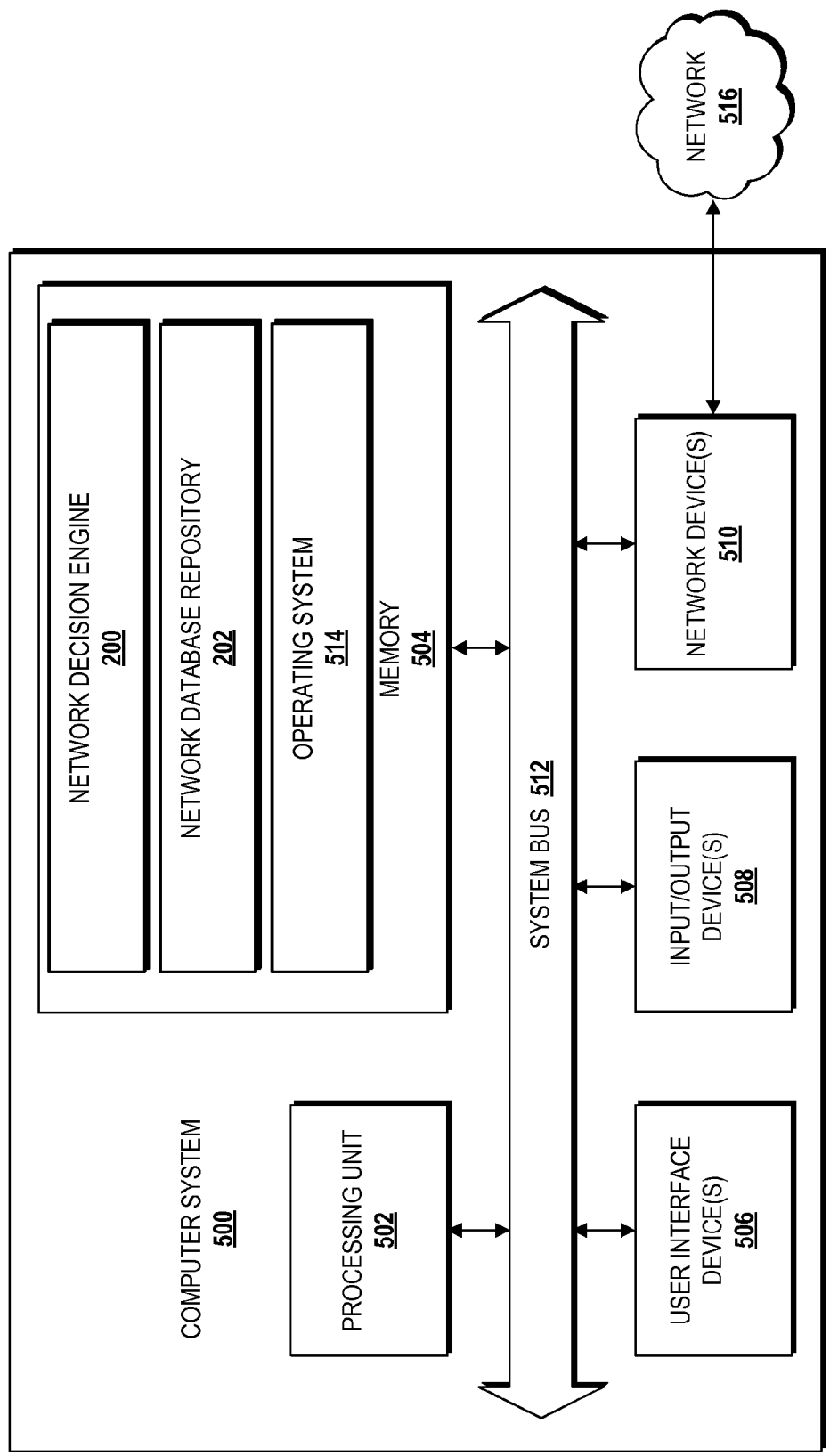
FIG. 5 is a block diagram illustrating an example computer system capable of implementing aspects of the embodiments presented herein.

FIG. 5 is a block diagram illustrating a computer system 500 configured to perform various operations disclosed herein. The computer system 500 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510. In some embodiments, the RAT selection system 106, the policy server 112, and/or the user profile server 116 are configured like the computer system 500. It should be understood, however, that the RAT selection system 106, the policy server 112, and/or the user profile server 116 may include additional functionality or include less functionality than now described. In the illustrated embodiment, the computer system 500 includes example software components for the RAT selection system 106.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514, the network decision engine 200, and the network database repository 202.

The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 506 may include one or more devices with which a user accesses the computer system 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 516, such as the RANs 104 illustrated and described with reference to FIG. 1 and/or other network(s). Examples of the network devices 510 include, but are not limited to, a modem, a radio frequency ("RF") or infrared ("IR") transceiver, a telephonic interface, a bridge, a router, or a network card. The network 516 may include a wireless network such as, but not limited to, a WLAN such as a WI-FI network, a WWAN, a wireless PAN ("WPAN") such as BLUETOOTH, or a wireless MAN ("WMAN"). Alternatively, the network 516 may be a wired network such as, but not limited to, a WAN such as the Internet, a LAN such as the Ethernet, a wired PAN, or a wired MAN.

The network 516 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 516. Therefore, the embodiments presented herein should not be construed as being limiting to a particular mobile telecommunications technology and/or standards utilizing such technologies.

Figure 6:
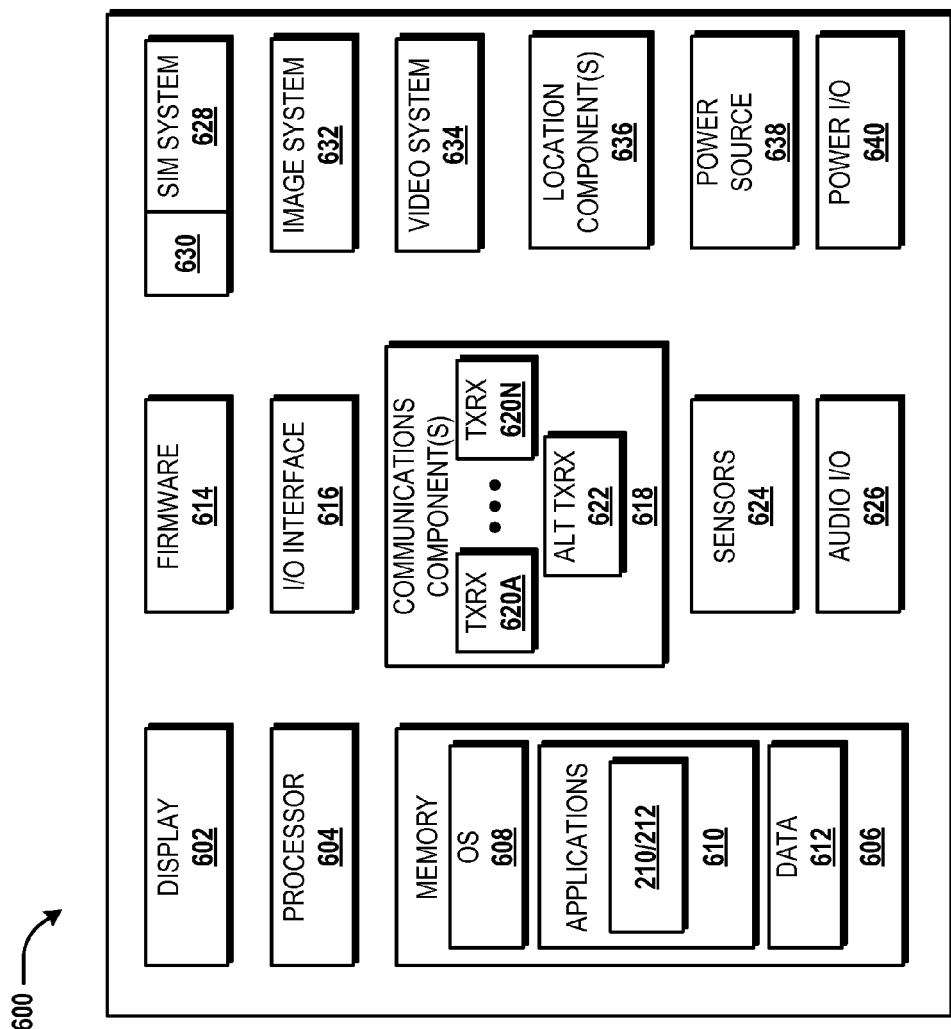
FIG. 6 is a block diagram illustrating an example mobile device capable of implementing aspects of the embodiments disclosed herein.

Turning now to FIG. 6, an illustrative mobile device 600 and components thereof will be described. In some embodiments, the mobile device 102 described above with reference to FIGS. 1 and 2 can be configured as and/or can have an architecture similar or identical to the mobile device 600 described herein in FIG. 6. It should be understood, however, that the mobile device 102 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, which may include the device-based network decision engine 210, the network connection manager 212, other computer-executable instructions stored in the memory 606, or the like. In some embodiments, the applications 610 also can include a UI application (not illustrated in FIG. 6).

The UI application can interface with the operating system 608, such as the operating system 208 shown in FIG. 2, to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in answering/initiating calls, data communications, entering/deleting data, entering and setting user IDs and passwords for device access, configuring settings, manipulating address book content and/or settings, multi-mode interaction, interacting with other applications 610, and otherwise facilitating user interaction with the operating system 608, the applications 610, and/or other types or instances of data 612 that can be stored at the mobile device 600. According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the RANs 104 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 500 described above with reference to FIG. 5. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Based on the foregoing, it should be appreciated that concepts and technologies for hybrid network-based and device-based intelligent radio access control have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A radio access technology selection system comprising:
a processor; and
a memory comprising computer-executable instructions that, when executed by the processor, cause the processor to perform operations comprising
receiving a policy rule,
receiving network load information for a plurality of radio access networks to which a target mobile device is capable of connecting, the plurality of radio access networks operating in accordance with a plurality of radio access technologies, the network load information comprising both historic network load information obtained based upon network load experienced by the plurality of radio access networks in a past time and current network load information obtained based upon network load experienced by the plurality of radio access networks in near real-time,
generating, based upon the policy rule and the network load information, a priority list specifying a priority order in which the target mobile device should select the plurality of radio access networks,
instructing the target mobile device to obtain, in response to receiving the priority list, local device information comprising performance measurement information and channel quality information, the performance measurement information comprising multiple radio access bearer test results obtained by the target mobile device via a multiple radio access bearer test performed by the target mobile device,
instructing the target mobile device to determine, based upon the priority list and the local device information, a radio access network to connect to from the plurality of radio access networks in the priority list, and
sending the priority list to the target mobile device.

2. The radio access technology selection system of claim 1, wherein the policy rule comprises conditions under which to select each of the plurality of radio access networks.

3. The radio access technology selection system of claim 2, wherein the conditions comprise network load thresholds for each of the plurality of radio access networks, the network load thresholds each identifying a maximum network load for one of the plurality of radio access networks.

4. The radio access technology selection system of claim 1, wherein the operations further comprise receiving a user profile associated with a user of the target mobile device, the user profile comprising information regarding a service agreement between the user and a service provider that provides a telecommunications service via at least a portion of the plurality of radio access networks, and wherein generating the priority list specifying the priority order in which the target mobile device should select the plurality of radio access networks is further based upon the user profile.

5. The radio access technology selection system of claim 1, wherein the local device information further comprises at least one of mobility state information of the target mobile device, battery utilization information of the target mobile device, or a user override input.

6. A method comprising:
receiving, at a radio access technology selection system, a policy rule;
receiving, at the radio access technology selection system, network load information for a plurality of radio access networks to which a target mobile device is capable of connecting, the plurality of radio access networks operating in accordance with a plurality of radio access technologies, the network load information comprising both historic network load information obtained based upon network load experienced by the plurality of radio access networks in a past time and current network load information obtained based upon network load experienced by the plurality of radio access networks in near real-time;
generating, by the radio access technology selection system, based upon the policy rule and the network load information, a priority list specifying a priority order in which the target mobile device should select the plurality of radio access networks;
instructing, by the radio access technology selection system, the target mobile device to obtain, in response to receiving the priority list, local device information comprising performance measurement information and channel quality information, the performance measurement information comprising multiple radio access bearer test results obtained by the target mobile device via a multiple radio access bearer test performed by the target mobile device;

instructing the target mobile device to determine, based upon the priority list and the local device information, a radio access network to connect to from the plurality of radio access networks in the priority list; and sending, by the radio access technology selection system, the priority list to the target mobile device.

7. The method of claim 6, wherein the policy rule comprises conditions under which to select each of the plurality of radio access networks.

8. The method of claim 7, wherein the conditions comprise network load thresholds for each of the plurality of radio access networks, the network load thresholds each identifying a maximum network load for one of the plurality of radio access networks.

9. The method of claim 6, further comprising receiving, at the radio access technology selection system, a user profile associated with a user of the target mobile device, the user profile comprising information regarding a service agreement between the user and a service provider that provides a telecommunications service via at least a portion of the plurality of radio access networks, and wherein generating the priority list specifying the priority order in which the target mobile device should select the plurality of radio access networks is further based upon the user profile.

10. The method of claim 6, wherein the local device information of the target mobile device further comprises at least one of mobility state information of the target mobile device, battery utilization information of the target mobile device, or a user override input.

11. The method of claim 10, wherein the mobility state information comprises a speed at which the target mobile device is currently moving or a movement pattern of the target mobile device.

12. A computer-readable storage medium comprising computer-executable instructions that, when executed by a processor of a radio access technology selection system, cause the radio access technology selection system to perform operations comprising:

receiving a policy rule;

receiving network load information for a plurality of radio access networks to which a target mobile device is capable of connecting, the plurality of radio access networks operating in accordance with a plurality of radio access technologies, the network load information comprising both historic network load information obtained based upon network load experienced by the plurality of radio access networks in a past time and current network load information obtained based upon network load experienced by the plurality of radio access networks in near real-time;

generating, based upon the policy rule and the network load information, a priority list specifying a priority order in which the target mobile device should select the plurality of radio access networks;

instructing the target mobile device to obtain, in response to receiving the priority list, local device information comprising performance measurement information and channel quality information, the performance measurement information comprising multiple radio access bearer test results obtained by the target mobile device via a multiple radio access bearer test performed by the target mobile device;

instructing the target mobile device to determine, based upon the priority list and the local device information, a radio access network to connect to from the plurality of radio access networks in the priority list; and sending the priority list to the target mobile device.

13. The computer-readable storage medium of claim 12, wherein the policy rule comprises conditions under which to select each of the plurality of radio access networks.

14. The computer-readable storage medium of claim 13, wherein the conditions comprise network load thresholds for each of the plurality of radio access networks, the network load thresholds each identifying a maximum network load for one of the plurality of radio access networks.

15. The computer-readable storage medium of claim 12, further comprising receiving a user profile associated with a user of the target mobile device, the user profile comprising information regarding a service agreement between the user and a service provider that provides a telecommunications service via at least a portion of the plurality of radio access networks, and wherein generating the priority list specifying the priority order in which the target mobile device should select the plurality of radio access networks is further based upon the user profile.

16. The computer-readable storage medium of claim 12, wherein the local device information of the target mobile device comprises mobility state information of the target mobile device.

17. The computer-readable storage medium of claim 16, wherein the mobility state information comprises a speed at which the target mobile device is currently moving.

18. The computer-readable storage medium of claim 16, wherein the mobility state information comprises a movement pattern of the target mobile device.

19. The computer-readable storage medium of claim 12, wherein the local device information comprises battery utilization information of the target mobile device.

20. The computer-readable storage medium of claim 12, wherein the local device information further comprises at least one of mobility state information of the target mobile device, battery utilization information of the target mobile device, or a user override input.

\* \* \* \* \*